(No Model.)
M. F. CARROLL.
VEHICLE SPRING.
No. 441,746. Patented Dec. 2, 1890.
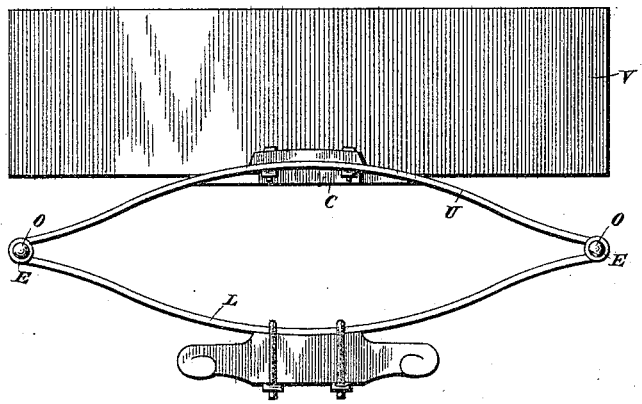
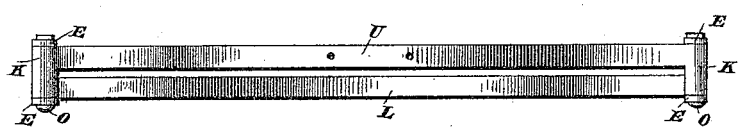
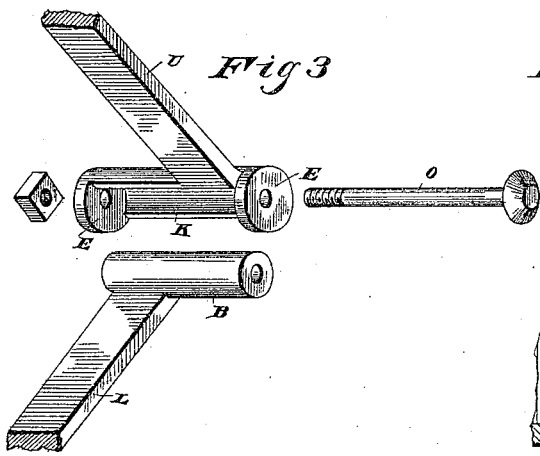
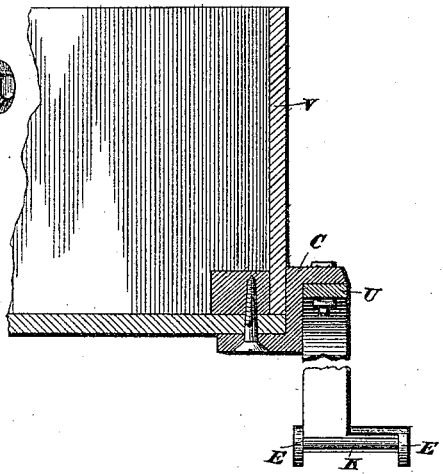
Witnesses:
Inventor
Michael F. Carroll,
By his Attorneys,

UNITED STATES PATENT OFFICE.

MICHAEL F. CARROLL, OF HILLSBOROUGH, OHIO, ASSIGNOR OF ONE-HALF TO A. W. DOWNHAM, OF SAME PLACE.

VEHICLE-SPRING.

SPECIFICATION forming part of Letters Patent No. 441,746, dated December 2, 1890.

Application filed April 16, 1890. Serial No. 348,220. (No model.)

*To all whom it may concern:*

Be it known that I, MICHAEL F. CARROLL, a citizen of the United States, residing at Hillsborough, in the county of Highland and State of Ohio, have invented a new and useful Vehicle-Spring, of which the following is a specification.

This invention relates to vehicle-springs; and the object thereof is to provide an improved pivot between the two members of a bow or elliptical spring.

To this end the invention consists of an elongated bearing at the ends of the lower member and an elongated socket at the ends of the upper member, all as hereinafter more fully described, and illustrated in the drawings, in which—

Figure 1 is a front elevation of my improved spring, showing it as connected to the front end of a vehicle-body. Fig. 2 is a plan view of the spring removed. Fig. 3 is an enlarged perspective view of the ends of the two members, taken from the under side, and showing them slightly separated. Fig. 4 is an enlarged cross-section through the center of the connection and the upper member.

The spring proper consists of two branches or members U L, whose bodies stand in parallel vertical planes, but the upper member slightly in rear of the lower. Said upper member U is provided at its ends with elongated sockets K of semicircular section, the ends E of which are turned down and perforated, and the lower member L is provided with elongated bearings B, centrally perforated so as to align with the perforations in said ends when the bearings are seated in the sockets. The spring of the upper member is made integral with the sockets and extends from the rear half thereof, and the spring of the lower member extends from the front half of the bearings, as shown in Fig. 2, whereby when the parts are assembled and held connected by the bolt O the upper member can spring without interfering with the lower or striking the same at all. By this construction I dispense with the rubber buffers so common in elliptical springs and allow a considerably greater movement of the two members than heretofore. I prefer to attach the socket to the upper member in order that dirt will not accumulate therein, although it will be obvious that the parts may be inverted, if desired, without departing from the spirit of my invention or detracting from its successful operation.

In order to bring the vehicle-body still farther down between the axles, which is well known to be desirable, I provide the strong metallic connection C, which is of Z-shape in cross-section. The lower bar of this connection is screwed or otherwise secured beneath the vehicle-body V, and the upper bar, which is considerably shorter, is bolted or otherwise connected to the upper member U of the elliptical spring. By this arrangement it will be seen that the vehicle-body will be permitted to pass inside the upper and inner member of the spring and will stand normally below the highest point thereof at the center, and the desired end is therefore attained.

I claim as the salient points of this invention—

The herein-described vehicle-spring, the same comprising a downwardly-bowed front member L, having integral cylindrical bearings B, standing at right angles to its ends, projecting partly to the rear thereof, and provided with longitudinal perforations, an upwardly-bowed rear member U, standing out of the vertical plane of said front member and having integral sockets across its ends and projecting partly forward thereof, said sockets consisting of semi-cylindrical bodies K, fitting over said bearings, and turned-down perforated ends E, fitting against the end of said bearings, and bolts O, passing through the aligned perforations in said ends and bearings, all as specified.

In testimony that I claim the foregoing as my own I have hereto affixed my signature in presence of two witnesses.

MICHAEL F. CARROLL.

Witnesses:
SAM H. FRANK,
A. D. WIGGINS.